United States Patent
Wei et al.

(10) Patent No.: US 10,642,792 B2
(45) Date of Patent: May 5, 2020

(54) DISTRIBUTED TRANSACTION CONFLICT RESOLUTION

(71) Applicant: Nicira, Inc., Palo Alto, CA (US)

(72) Inventors: Michael Wei, Palo Alto, CA (US);
Dahlia Malkhi, Palo Alto, CA (US);
Amy Tai, Princeton, NJ (US)

(73) Assignee: VMware, Inc., Palo Alto, CA (US)

( * ) Notice: Subject to any disclaimer, the term of this patent is extended or adjusted under 35 U.S.C. 154(b) by 199 days.

(21) Appl. No.: 15/652,981

(22) Filed: Jul. 18, 2017

(65) Prior Publication Data
US 2018/0276234 A1    Sep. 27, 2018

Related U.S. Application Data

(60) Provisional application No. 62/476,578, filed on Mar. 24, 2017.

(51) Int. Cl.
*G06F 16/17*     (2019.01)
*G06F 16/23*     (2019.01)

(52) U.S. Cl.
CPC ...... *G06F 16/1734* (2019.01); *G06F 16/2308* (2019.01)

(58) Field of Classification Search
CPC .................................................. G06F 11/1471
USPC ......................................................... 707/639
See application file for complete search history.

(56) References Cited

U.S. PATENT DOCUMENTS

| | | | | |
|---|---|---|---|---|
| 10,198,321 B1* | 2/2019 | Gordon | ............... | G06F 11/1448 |
| 2010/0049930 A1* | 2/2010 | Pershin | ............... | G06F 11/1451 |
| | | | | 711/162 |
| 2010/0076934 A1* | 3/2010 | Pershin | ............... | G06F 11/1451 |
| | | | | 707/640 |
| 2010/0077165 A1* | 3/2010 | Lu | ........................ | G06F 11/1451 |
| | | | | 711/162 |
| 2012/0233123 A1* | 9/2012 | Shisheng | ............... | G06F 11/004 |
| | | | | 707/639 |
| 2014/0156618 A1* | 6/2014 | Castellano | .......... | G06F 16/2358 |
| | | | | 707/703 |
| 2014/0258777 A1* | 9/2014 | Cheriton | ............. | G06F 11/1471 |
| | | | | 714/19 |
| 2014/0279907 A1* | 9/2014 | Koza | ................... | G06F 11/1451 |
| | | | | 707/639 |

OTHER PUBLICATIONS

Mahesh Balakrishnan et al., "CORFU: A Shared Log Design for Flash Clusters", 9th USENIX Symposium on Networked Systems Design and Implementation, Apr. 25-27, 2012, 14 pages.
Mahesh Balakrishnan et al., "Tango: Distributed Data Structures over a Shared Log", Nov. 1, 2013, 16 pages.
Philip A. Bernstein et al., "Hyder—A Transactional Record Manager for Shared Flash", 5th Biennial Conference on Innovative Data Systems Research (CIDR '11), Jan. 9-12, 2011, 12 pages.
Michael Wei et al., "vCorfu: A Cloud-Scale Object Store on a Shared Log", VMware Research Group, Jan. 2017, 15 pages.

* cited by examiner

*Primary Examiner* — Baoquoc N To (57) ABSTRACT

In accordance with disclosed embodiments, a shared log system includes a sequencer that receives a source object and a snapshot time reference, where the source object is used to generate data for a destination object. The sequencer uses the snapshot time to determine whether the data state of the source object is current with respect to the snapshot time, to assess correctness of the generated data relative to the snapshot time.

20 Claims, 6 Drawing Sheets

Fig. 9A time = $t_0$

Client 1 reads A(100) @ $t_0$; wants to write B ← A+22

Client 2 reads B(200) @ $t_0$; wants to write A ← B+77

Fig. 9B time = $t_0$

Client 1 read A(100) @ $t_0$; wants to write B ← A+22

Client 2 read B(200) @ $t_0$; wants to write A ← B+77

Client 2 verifies with sequencer, sends A (Wt), B (Rd), and time $t_0$         sequencer returns COMMIT and time $t_1$ for A     Client 2 commits write operation on A(277) at time $t_1$

Fig. 9C time = $t_1$

Client 1 read A(100) @ $t_0$; wants to write B ← A+22

Client 1 verifies with sequencer, sends A(Rd), B (Wt), and time $t_0$
        sequencer returns FAIL and time $t_1$ for A     Client 1 reads A(277) @ $t_1$     Client 1 verifies with sequencer, sends A (Rd), B (Wt), and time $t_1$
        sequencer returns COMMIT and time $t_2$ for B     Client 1 commits write operation on B(299) at time $t_2$

DISTRIBUTED TRANSACTION CONFLICT RESOLUTION

CROSS REFERENCE TO RELATED APPLICATIONS

Pursuant to 35 U.S.C. § 119(e), this application is entitled to and claims the benefit of the filing date of U.S. Provisional App. No. 62/476,578 filed Mar. 24, 2017, the content of which is incorporated herein by reference in its entirety for all purposes.

BACKGROUND

Transactions are a fundamental building block for reliable concurrent systems. They enable programmers to express a unit of work which a system will perform, and provide guarantees on how that unit of work will be executed with respect to other transactions in the system. In a distributed system, multiple clients may simultaneously request transactions, and these transactions may sometimes conflict with each other, depending on the guarantees provided by the system. For instance, two transactions in an object store may try to modify the same object. In most systems, a transaction manager can be used detect such conflicts and may abort one of the transactions to maintain correctness. Conventional systems typically achieve this through the use of locks or write-ahead logging, global logging and the like, or otherwise relax certain guarantees provided by the system. Locking and write-ahead logging require considerable overhead, which can hamper throughput and increase latency, and thus can be deemed "heavyweight" processes for this reason. Global logging, on the other hand, is a technique where conflict resolution is derived from recording every transaction on a single global log. Global logging imposes a burden on the client with having to perform their own transaction resolution. Since no entity maintains the latest version of each object, the client must playback the entire log to find the latest versions of each object of interest in order to determine whether or not a conflict occurs. In addition, aborted transactions can be logged which can slow the playback process and greatly limit the scalability of the system as the number of clients grow.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

The present disclosure is directed to distributed transactional systems in which the ordering of transactions can be processed by a sequencer. A sequencer in accordance with the present disclosure can replace conventional heavyweight mechanisms that use locking, write-ahead logging, and other processing that can burden the client. Funneling all transactions through a lightweight transaction sequencer to perform conflict resolution and keep track of the state of each object in the system, reduces the processing burdens on clients and allows the system to scale up.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
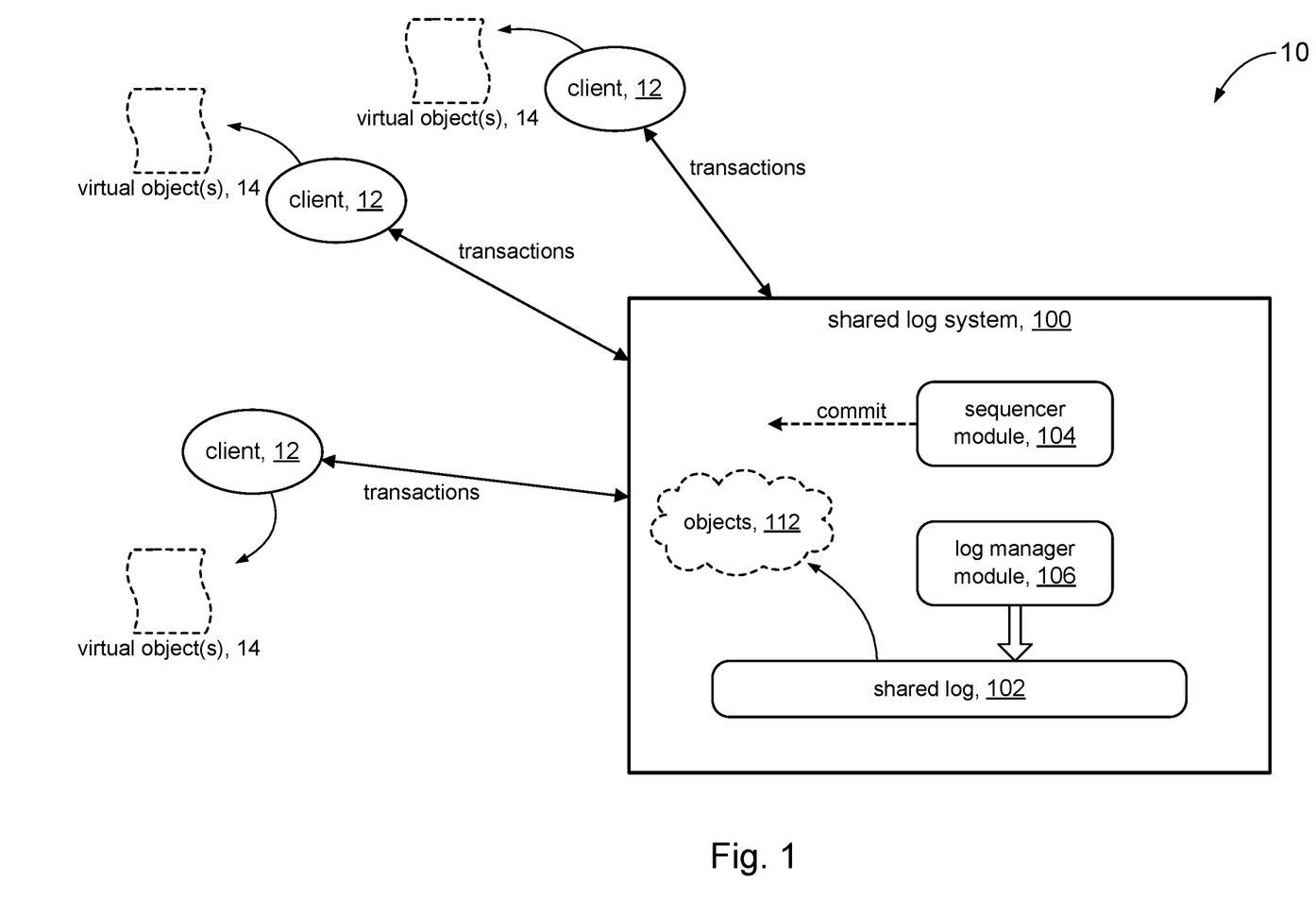
FIG. 1 shows a system using a shared log in accordance with the present disclosure.

FIG. 1 shows an example of a distributed system 10 comprising a shared log system 100 in accordance with the present disclosure. The shared log system 100 represents objects 112 that clients 12 can access (read and write). In shared log systems, the objects 112 typically are not persisted but rather exist only in terms of the history of client transactions performed on the objects 112. Transactions can include operations such a create, delete, modify, arithmetic operations, and so on.

In some embodiments, for example, the shared log system 100 comprises a shared log 102 that stores transactions made on the objects 112 by clients 12. A client 12 can instantiate and maintain its own copies of the objects 112, shown in FIG. 1 as virtual objects 14, by using the shared log 102. The most current state of a virtual object 14, for example, can be obtained by accessing transactions in the shared log 102 that were made on the object 112 of interest and replaying those transactions.

In accordance with the present disclosure, the shared log system 100 can include a sequencer module 104 and a log manager module 106. The sequencer module 104 timestamps or sequences transactions to be made by the clients 12. The log manager module 106 provides buffering of data associated with transactions to be committed. These aspects of the present disclosure are discussed in more detail below.

Figure 2:
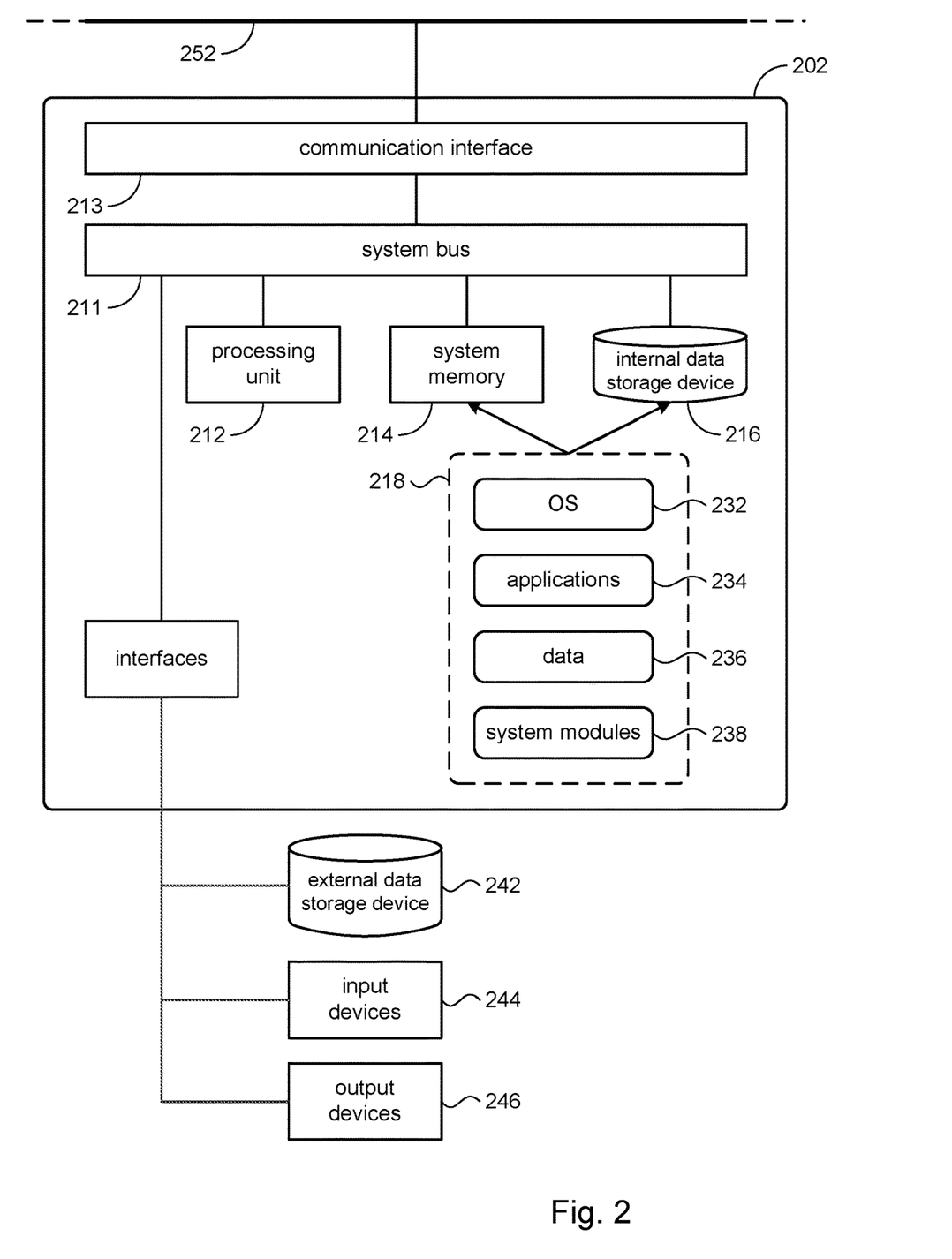
FIG. 2 shows an illustrative example of a computer system in accordance with the present disclosure.

Referring to FIG. 2, an illustrative implementation of the shared log system 100 may include a computer system 202 having a processing unit 212, a system memory 214, and a system bus 211. The system bus 211 may connect various system components including, but not limited to, the processing unit 212, the system memory 214, an internal data storage device 216, and a communication interface 213.

The processing unit 212 may comprise a single-processor configuration, or may be a multi-processor architecture. The system memory 214 may include read-only memory (ROM) and random access memory (RAM). The internal data storage device 216 may be an internal hard disk drive (HDD), a magnetic floppy disk drive (FDD, e.g., to read from or write to a removable diskette), an optical disk drive (e.g., for reading a CD-ROM disk, or to read from or write to other high capacity optical media such as the DVD, and so on). In various embodiments, the internal data storage 216 may be a flash drive.

The internal data storage device 216 may comprise non-transitory computer-readable storage media to provide non-volatile storage of data, data structures, computer-executable instructions, and so forth. Although the description of computer-readable media above refers to a HDD, a removable magnetic diskette, and a removable optical media such as a CD or DVD, it is noted that other types of media which are readable by a computer, such as zip drives, magnetic cassettes, flash memory cards, cartridges, and the like, may also be used, and further, that any such media may contain computer-executable instructions for performing the methods disclosed herein.

The system memory 214 and/or the internal data storage device 216 may store various program and data modules 218, including for example, operating system 232, one or more application programs 234, program data 236, and other program/system modules 238. For example, in a computer system 202 configured as shared log system 100, the application programs 234, which when executed, may cause the computer system 202 to perform operations of the sequencer module 104 and operations of the log manager module 106. The computer system 202 can execute the sequencer module 104 as a first process, and likewise, the computer system 202 can execute the sequencer module 104 as a second process separate and different from the first process.

An external data storage device 242 may be connected to the computer system 202. For example, in a computer system 202 configured as shared log system 100, the external data storage device 242 be used to store the shared log 102. The external data storage device 242 may store various data used by the sequencer module 104 and/or the log manager module 106.

Access to the computer system 202 may be provided by a suitable input device 244 (e.g., keyboard, mouse, touch pad, etc.) and a suitable output device 246, (e.g., display screen), for example, for administrative access.

The computer system 202 may operate in a networked environment using logical connections via wired and/or wireless communications to one or more remote computers (not shown) over a communication network 252. The communication network 252 may be a local area network (LAN) and/or larger networks, such as a wide area network (WAN). For example, clients 12 can interact with computer system 202 over communication network 252.

Figure 3:
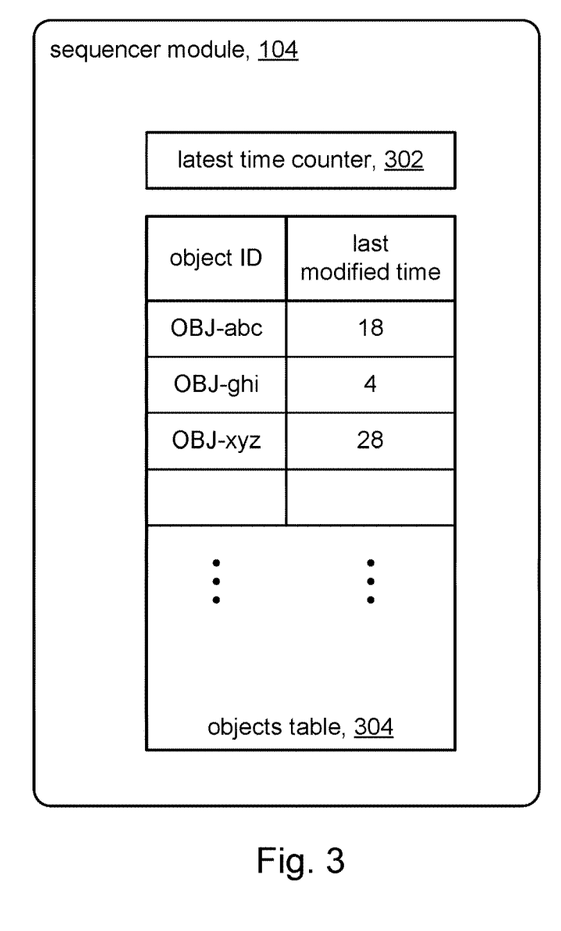
FIG. 3 shows a simplified representation of data that can be used in some embodiments of a sequencer module in accordance with the present disclosure.

FIG. 3 shows a simplified representation of data that can be used by the sequencer module 104. In some embodiments, for example, the sequencer module 104 can maintain a latest time counter 302. The counter 302 can be an integer value of suitable size (e.g., 64-bit counter) that represents a sense of time in the shared log system 100. Each occurrence of a transaction that is committed to the shared log 102 can constitute a point in time that is tracked by the latest time counter 302. As such, the latest time counter 302 can be a monotonically increasing counter.

In some embodiments, the sequencer module 104 can include an objects table 304 that records a last-modified time for each object 112 in the shared log system 100. The objects table 304 can include a column of object identifiers that identifies each object 112 in the shared log system 100, and a last-modified time column that stores the last-modified time corresponding to each object 112. The last-modified time of an object 112 represents a time vis-à-vis the latest time counter 302 that the object 112 was last modified. Merely to illustrate this point, FIG. 3 shows three objects OBJ-abc, OBJ-ghi, OBJ-xyz having respective last-modified times of 18, 4, 28.

Figure 4:
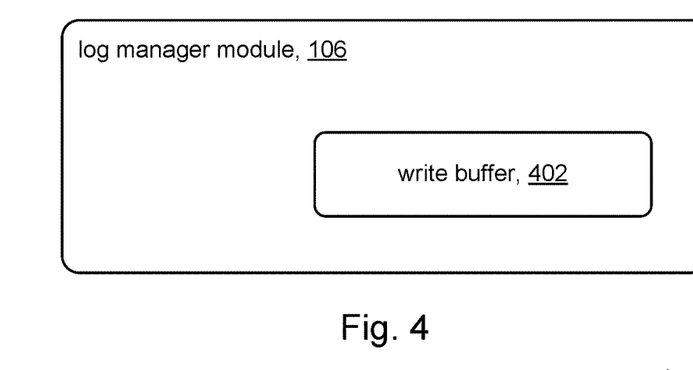
FIG. 4 shows a simplified representation of data that can be used in some embodiments of a log manager module in accordance with the present disclosure.

FIG. 4 shows s simplified representation of data that can be used by the log manager module 106. In some embodiments, for example, the log manager module 106 can include a transaction write buffer 402. The transaction write buffer 402 can be to hold a transaction received from a client 12 in order to write the transaction to the shared log 102. In some embodiments, the transaction write buffer 402 can provide a caching function.

Figure 5:
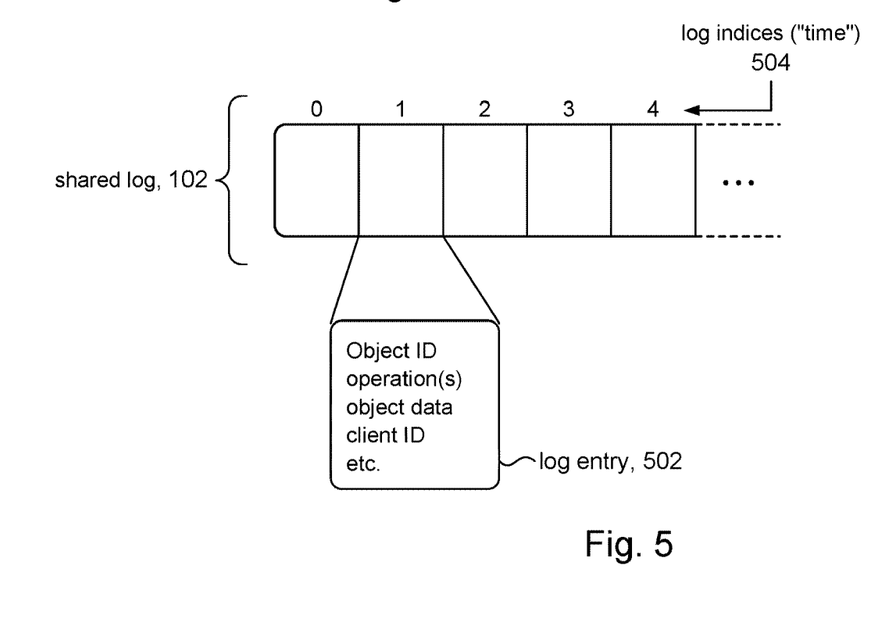
FIG. 5 shows a simplified representation of a shared log.

FIG. 5 shows a simplified representation of a shared log 102 in accordance with some embodiments of the present disclosure. The shared log 102 can comprise a set of log entries 502, one such entry for each transaction. Each log entry 502 can store the details of its corresponding transaction, including but not limited to an object identifier that identifies the target object of the transaction, one or more operations specified in the transaction, any data associated with the transaction, an identifier of the client 12 that requested the transaction, and so on. Each log entry 502 may be identified by a log index 504 that represents is ordinal position in the shared log 102, and hence the "time" of the relative to other log entries in the shared log 102. Thus, for example, a log entry 502 having a log index 504 of n occurs earlier in time than a log entry having a log index of n+1, and later in time than a log entry having a log index of n−1. The log index 504 can be referred to variously as time, log address, version number, timestamp, and the like.

A client 12 can generate the latest state of an object by replaying all the transactions made to that object from the time of its instantiation. The idea of "replay" is a well known and understood concept. Briefly, to replay an object the client 12 reads the shared log 102 for the transactions made to that object and serially applies the transactions starting from the time of its instantiation.

The discussion will now turn to a description of an operational flow in the shared log system 100 in accordance with the present disclosure.

Figure 6:
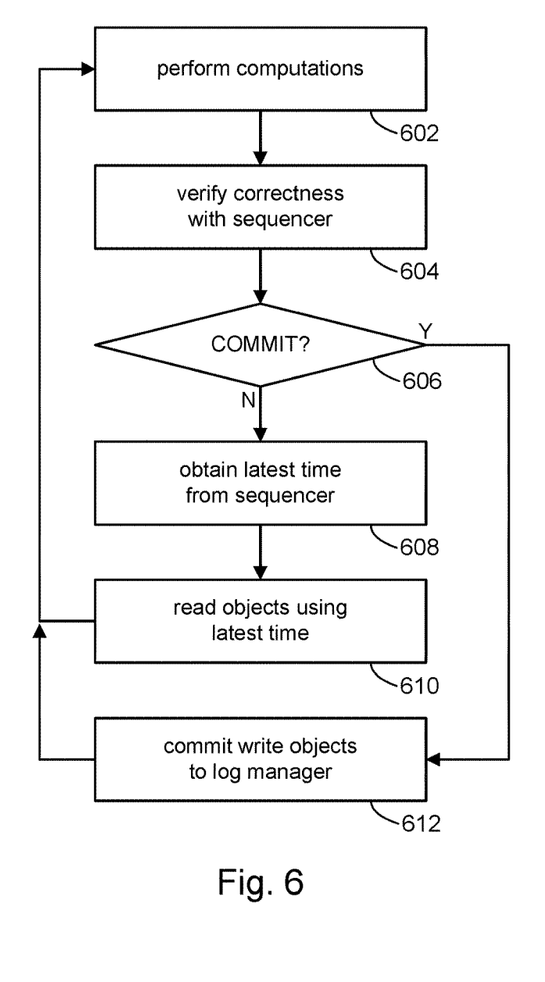
FIG. 6 depicts an operational flow in a client in accordance with the present disclosure.

FIG. 6, in conjunction with the previous figures, shows a high level operational flow in a client (e.g., 12).

At operation 602, the client 12 can perform a series of operations and/or computations on one or more objects (e.g., 112) in the shared log system 100. The operations and/or computations can include a set of objects that serve as the source of data for the transaction (call these the "read objects"), and a set of objects that are to be modified by the transaction (call these the "write objects"). To illustrate, consider the example of a credit card. Updating a balance due on a credit card (write object) may include accessing a set of charges (read objects) made against the credit card and a set of payments (read objects) made on the credit card. The client 12 may already have some of the read objects in its set of virtual objects 14 (e.g., from a previous transaction). For other read objects in the transaction, the client 12 can read them in from the shared log 102.

At operation 604, when the client 12 has completed its computations and is ready to submit a transaction (e.g., final balance amount on the credit card) to the shared log 102, the client 12 can first verify the correctness of that transaction.

Verification of correctness is performed because there is no guarantee that the read objects comprising the source data used for the calculations were at their most current state at the time the client 12 made its calculations, because other clients in the system 10 may have made updates to those read objects.

Accordingly, in some embodiments, the client 12 can send a verify transaction request to the sequencer module 102. The verify transaction request can include a set of identifiers (the "write set") for each of the write objects, a set of identifiers (the "read set") for each of the read objects, and a snapshot time. The "snapshot time" is a time reference that indicates state of the read objects used to make the computations. Each client 12 can maintain their own "snapshot time." In accordance with the present disclosure, the snapshot time can be provided by the sequencer module 104; for example, each time a client's transaction is committed to the shared log 102 the sequencer module 104 can provide the client 12 with the value of the latest time counter 302. In other instances, the client 12 may request the sequencer module 104 for the last-modified time of a given object, which can be used as the snapshot time.

It is worth noting here that the information load in the verify request to the sequencer module 104 can be kept to a minimum. In other words, the verify request can contain the minimum amount of information that the sequencer module 104 needs to do its job. For example, the verify request can comprise only identifiers of the write objects and identifiers of the read objects; the verify request does not have to include any of the data associated with the write and read objects. Likewise, the verify request does not have to include the operations and/or computations used to compute the data for the write objects. This is an important consideration since all clients in the system 10 go through the sequence module 104 to verify the correctness of their respective transactions, and so the interface to the sequencer module 104 needs to be lightweight by omitting any extraneous information in the verify request.

At operation 606, the client 12 can receive a response to the verify transaction request indicating whether the transaction can be committed or should be aborted. For example, in response to the client 12 receiving a COMMIT from the sequencer module 104, processing in the client 12 can proceed to operation 612 to commit the transaction. On the other hand, in response to the client 12 receiving a negative response (e.g., FAIL), the client 12 can proceed to operation 608.

At operation 608, the client 12 can respond to the FAIL response by simply aborting the transaction, and continue processing with another transaction. A FAIL response indicates that the read objects (source data) used by the client 12 to make the computations for the transaction were not at their latest state; in other words, there was a conflict between the states of the read objects stored in the client 12 versus and the sequencer's states of those read objects. The computations performed by client 12 are therefore likely to be incorrect. In response, the client 12 can retry the computations. As an initial step, the client 12 can query the sequencer module 104 for the latest time counter 302 to update its snapshot time to the sequencer's latest time.

At operation 610, the client 12 can use the updated snapshot time to generate the latest state of its read objects using the latest time obtained in operation 608. For example, using the latest time, the client 12 can replay transactions from the shared log 102 up to the latest time for each read object, thus obtaining the latest state of the read objects in the client's set of virtual objects 14. The client 12 can then repeat processing of the transaction beginning at operation 602.

At operation 612, in response to receiving a COMMIT from the sequencer module 104, the client 12 can commit the transaction. A COMMIT response indicates that the state of the read objects (source data) used by the client 12 to make the computations match the sequencer's states of those read objects. Accordingly, the computation should be correct with respect to the read objects. The client 12 can commit the transaction by submitting a write transaction of the write objects (e.g., final balance amount on the credit card) to the log manager module 106. For example, the client 12 can send a message to the log manager module 106 to buffer the transaction in the log manager module's transaction write buffer 402 to be written to the shared log 102. In addition to receiving a COMMIT from the sequencer module 104, the client 12 can receive the value of the latest time counter 302, which can be used to update the client's snapshot time.

Figure 7:
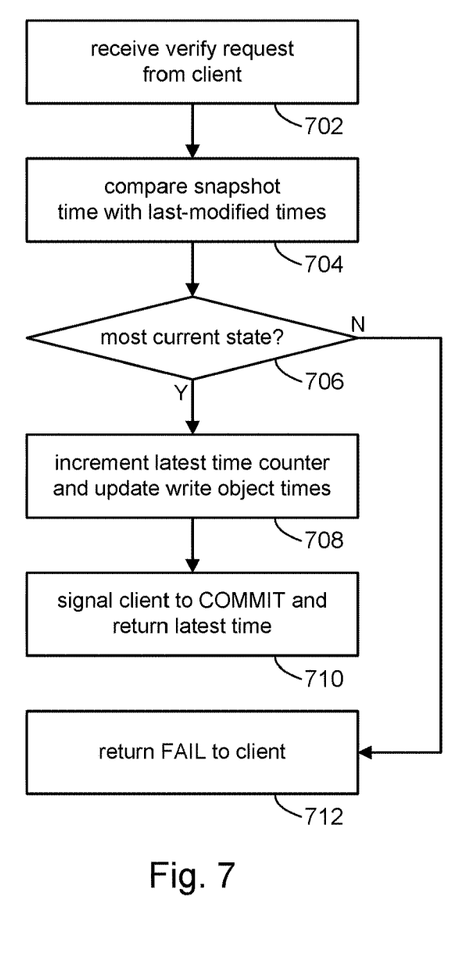
FIG. 7 depicts an operational flow in a sequencer module in accordance with the present disclosure.

FIG. 7, in conjunction with the previous figures, shows a high level operational flow in the sequencer module 104 for verifying the correctness of a transaction in accordance with the present disclosure. In some embodiments, for example, the sequencer module 104 can include computer executable program code, which when executed by a computer system (e.g., 202, FIG. 2), can cause the computer system to perform processing in accordance with FIG. 7.

At operation 702, the sequencer module 104 can receive a verify request from a client 12 (see operation 606, FIG. 6, for example). As explained above, the verify request can include identifiers of the write objects and read objects associated with the transaction and a snapshot time. The client 12 can provide any timer reference as the snapshot time. Presumably, however, the client 12 will provide a snapshot time that it believes represents the latest state of the data of the read objects identified in the verify request. As noted above, the verify request does not include (nor does it require) the operations/computations that comprise the transaction, nor the source data or data computed from the source data. In this way, the sequencer module 104 can be quickly invoked.

At operation 704, the sequencer module 104 can compare the latest-modified time of each identified read object against the snapshot time received in the verify request. In some embodiments, for example, the sequencer module 104 can use the objects table 304 to look up each identified read object, and compare the snapshot time against the latest-modified times from the objects table 304.

At operation 706, the sequencer module 104 can make a determination whether the snapshot time represents the most current state of the identified read objects, relative to the snapshot time. For example, if the snapshot time is greater than or equal to the latest-modified time of a given read object, then that read object can be deemed to be at its most current state relative to the snapshot time, since it was last modified at a time earlier than the snapshot time. Conversely, if the snapshot time is less than the latest-modified time of the given read object, then that read object can be deemed to be at a state that is more recent than the snapshot time.

If the snapshot time is greater than or equal to the latest-modified time of each read object identified in the verify request, that means each read object is at its most recent state. Thus, the computations made using the data of the read objects (source data) can be deemed to be "correct" in that all the source data is at its most current state relative to the snapshot time. In response, the sequencer module 104 can continue processing at operation 708.

If the above condition does not hold for at least one of the identified read objects, then whatever computations were made using those read object can be deemed to be "incorrect" in that not all the source data is at its most current state relative to the snapshot time. In response, the sequencer module 104 can continue processing at operation 712.

It is noted here, that verification in accordance with the present disclosure can be achieved using a single message roundtrip from the client 12, without the use of heavyweight mechanisms such as locking or write-head logging. The sequencer module 104 uses only the snapshot time provided by the client 12 and a list of time values (e.g., 64-bit values) for each object to do a simple in-memory comparison for each read object to perform conflict resolution.

At operation 708, the sequencer module 104 has determined that the transaction is "correct" in terms of the source data used to compute the transaction. The sequencer module 104 can increment its latest timer counter 302 to mark this point time.

The sequencer module 104 can then update each of the identified write objects in the verify request with the newly incremented latest timer counter 302. Committing the transaction means that the objects identified in the transaction are now updated. Those objects (the write objects) are identified in the verify request. Accordingly, entries in the objects table 304 that match the write object identifiers can be updated with the new value of the latest timer counter 302 so that their latest-modified fields reflect the time of their latest modification vis-à-vis the commitment of the transaction.

At operation 710, the sequencer module 104 can signal the client 12 to COMMIT the transaction. The sequencer module 104 can also provide the latest timer counter 302 (see operation 606, FIG. 6) to the client 12.

At operation 712, the sequencer module 104 can return a FAIL code to the client (see operation 612, FIG. 6).

As noted above, processing in accordance with the present disclosure allows the client to verify correctness of the transaction in a single message roundtrip, without having to employ time consuming mechanisms such as locking, write-logging, and the like. Processing by the sequencer module 104 is efficient; it needs only to maintain a counter (latest-modified time) per object, and do simple in-memory comparisons to assess correctness of the transaction without the need for the source data or the operations and/or computations of the transaction. This lightweight interface to the sequencer module 104 allows it to be used by all clients in the shared log system 100.

Figure 8:
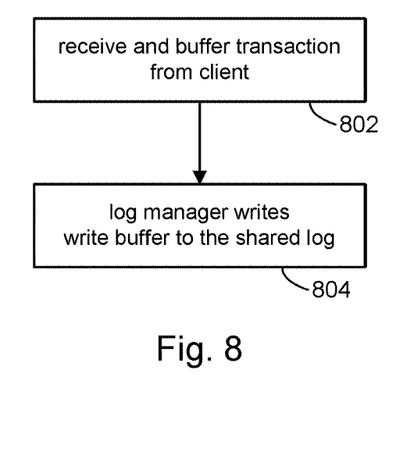
FIG. 8 depicts an operational flow in a log manager module in accordance with the present disclosure.

FIG. 8, in conjunction with the previous figures, shows a high level operational flow in the log manager module 106 for committing a transaction in accordance with the present disclosure. In some embodiments, for example, the log manager module 106 can include computer executable program code, which when executed by a computer system (e.g., 202, FIG. 2), can cause the computer system to perform processing in accordance with FIG. 8.

At operation 802, the log manager module 106 can receive a transaction from a client 12 (see operation 604, FIG. 6, for example). The log manager module 106 can buffer the received transaction in its transaction write buffer 402. The received transaction can include one or more write objects to be written. Each write object can include, among other things, an object identifier and the data associated with the write object.

At operation 804, the log manager module 106 can write the received transaction stored in the transaction write buffer 402 to the shared log 102. In some embodiments, for example, the log manager module 106 can allocate space for another entry in the shared log 102 for each write object to store the write object. The write buffer 402 can retain the received transaction for subsequent reads operations on the write objects contained in the received transaction, and thus act as a kind of caching mechanism.

Figure 9A:
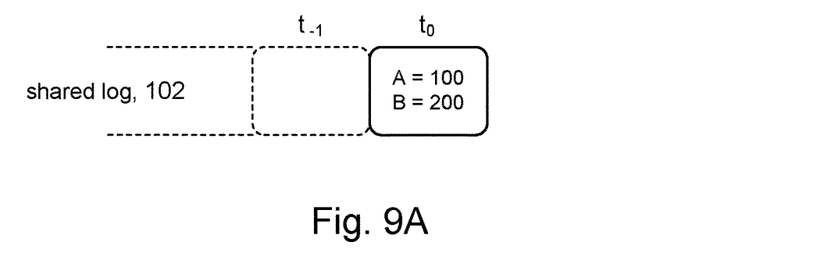
FIGS. 9A, 9B, 9C, 9D, 9E depict an illustrative sequence of writing to a shared log in accordance with the present disclosure.

FIGS. 9A-9E depict a sequence of transactions on shared log 102 to illustrate an example of processing in accordance with aspects of the present disclosure. FIG. 9A shows the state of the shared log 102 up to a present time $t_0$. FIG. 9A shows that at time $t_0$, an object A has a value of 100, and an object B has a value of 200. Presumably, objects A and B were updated at time $t_0$, which is why they appear in the shared log 102 at time $t_0$.

Figure 9B:
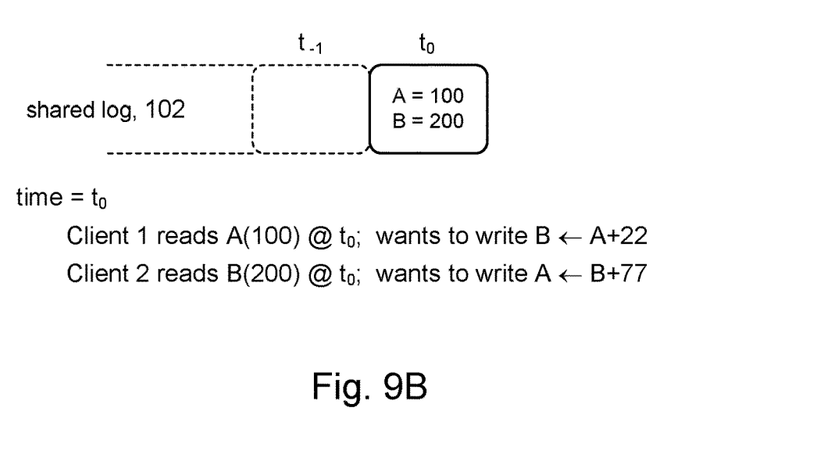

FIG. 9B shows that two clients Client 1, Client 2 read from the shared log 102 at time $t_0$. Client 1 reads object A (value is 100), performs a computation (e.g., sum, A+22=122), and wants to write the sum to object B. Client 2 reads object B (value is 200), performs a computation (e.g., sum, B+77=277), and wants to write the sum to object A. This represents a conflict because Client 1 performs a computation using object A, while Client 2 wants to write to object A. Conversely, Client 2 performs a computation using object B, while Client wants to write object B.

Figure 9C:
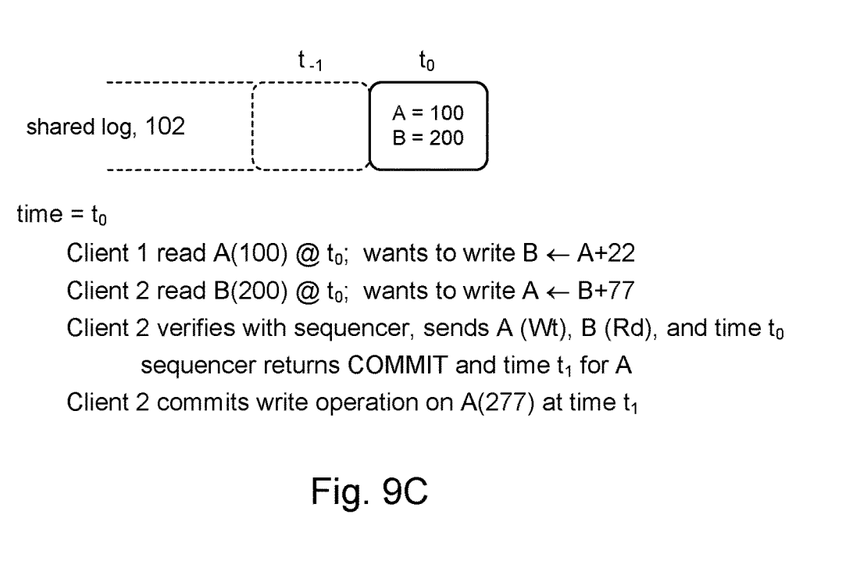

Referring to FIG. 9C, suppose Client 2 is ready to write object A before Client 1 is ready to write object B. Per FIG. 6, Client 2 will verify the correctness of its computation (block 604) with the sequencer module 104. In particular, Client 2 will send a verify transaction request to the sequencer module 104 comprising a write set and a read set. In this case, the write set will comprise an identifier for object A, and the read set will comprise an identifier for object B. Note that the values (which can comprise very large data structures) of the objects need not be sent to the sequencer, thus keeping communication with the sequencer module 104 "lightweight." The verify request can also include time $t_0$, to indicate to the sequencer module 104 this is the snapshot time which the read objects (in this case object B) were read from the shared log 102. Per FIG. 7, the sequencer module 104 will compare the snapshot time received from Client 2, namely time $t_0$, against the last-modified time (from objects table 304) for each read object in the read set, namely object B. As can be seen in FIG. 9C, the last-modified time for object B at this point is time $t_0$. Accordingly, the sequencer module 104 will signal Client 2 to commit the write transaction on object A, and include an updated time for object A (blocks 798, 710) which will be time $t_1$. Client 2 can commit the write of object B with value 277.

Figure 9D:
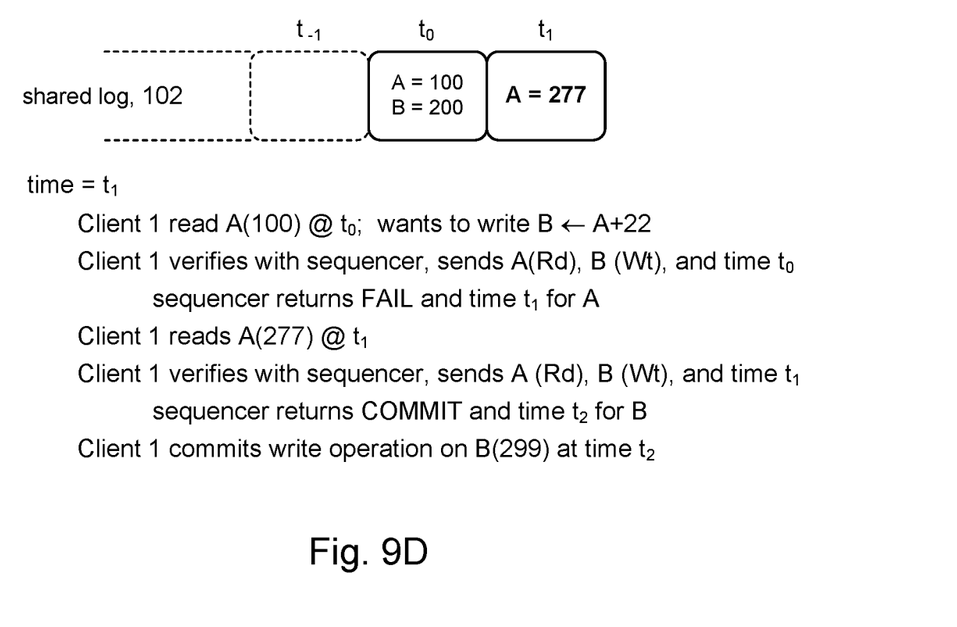

FIG. 9D shows the shared log 102 at time $t_1$, which shows a new entry for object A and its value of 277. Suppose that Client 1 is ready to write object B. Like Client 2, Client 1 will verify the correctness of its computation with the sequencer module 104. In particular, Client 1 will send a verify transaction request to the sequencer module 104 comprising a write set (comprising object B) and a read set (comprising object A). The verify request will include the snapshot time which Client 1 read object A from the shared log 102, which is time $t_0$. Per FIG. 7, the sequencer module 104 will compare the snapshot time received from Client 1, namely time $t_0$, against the last-modified time for each read object in the read set, namely object A. As can be seen in FIG. 9D, the last-modified for object A is now time $t_1$. Accordingly, the sequencer module 104 can signal (block 712) a FAIL to Client 1, who in response can obtain the latest time (i.e., time $t_1$) for object A from the sequencer module (block 608, FIG. 6). In some embodiments, the sequencer module 104 can return the latest time for object A.

Figure 9E:
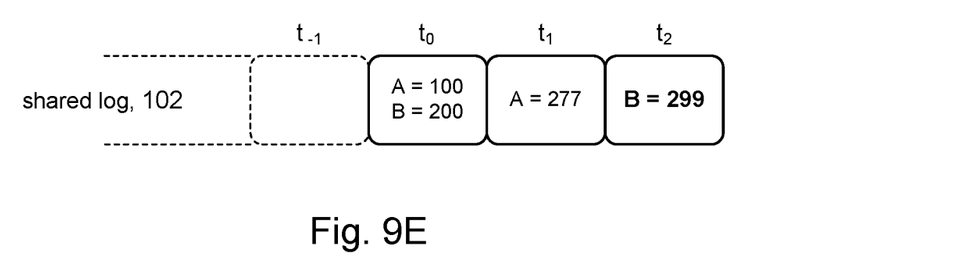

FIG. 9D shows that Client 1 can re-read object A (for time $t_1$) to obtain the latest value, namely 277, and redo the computation, namely A+22, to obtain the sum 299. Client 1 can repeat the verify transaction request with the sequencer module 104. This time around, the sequencer module 104 will signal Client 1 to commit the write transaction on object b, and include an updated time for object B, which will be time $t_2$. Client 1 can commit the write of object A with value 299. FIG. 9E shows the shared log 102 at time $t_2$, which shows a new entry for object B and its value of 299.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a shared log system, the method comprising:
   receiving, by a sequencer module, a request to verify a transaction, the transaction including a read operation of reading source data from a source object in a shared log and a write operation of writing a write data to a destination object in the shared log, the write data being generated based on at least the source data, the request identifying the source object and the destination object, the request also including a snapshot time that is a time reference that represents a state of the source object that was used to generate the write data;
   verifying the transaction by comparing the snapshot time with a last-modified time of the source object to determine whether or not the snapshot time represents a most current state of the source object; and
   causing, by the sequencer module, the write operation to be committed to the shared log in response to the transaction being verified.

2. The method of claim 1, wherein the source object has a corresponding last-modified time that represents a time of last modification of the source object, the method further comprising the sequencer module comparing the snapshot time with the last-modified time of the source object to determine whether the snapshot time represents the most current state of the source data that was used to compute the write data.

3. The method of claim 2, wherein the snapshot time represents the most current state of the source data when the snapshot time is greater than or equal to the last-modified time of the source object.

4. The method of claim 1, wherein the destination object has a corresponding last-modified time that represents a time of last modification of the destination object, the method further comprising the sequencer module incrementing the last-modified-time for the destination object in response to a determination that the most current state of the source data was used to generate the write data.

5. The method of claim 1, further comprising: receiving, by a log manager module, the write data; and writing, by the log manager module, the write data to the shared log.

6. The method of claim 5, further comprising the sequencer module signaling a client machine in response to a determination that the snapshot time represents a most current state of the source data that was used to compute the write data, wherein the client machine sends the write data to the log manager module to be written to the shared log.

7. The method of claim 5, further comprising:
   storing, by the log manager module, the received write data to a write buffer; and
   deleting, by the log manager module, the received write data from the write buffer without committing the write data to the shared log in response to a determination that the snapshot time does not represent the most current state of the source data that was used to generate the write data.

8. A non-transitory computer-readable storage medium having stored thereon computer executable instructions, which when executed by a computer system, cause the computer system to execute a first process to:
   receive a request to verify a transaction, the transaction including a read operation of reading source data from a source object in a shared log and a write operation of writing a write data to a destination object in the shared log, the write data being generated based on at least the source data, the request identifying the source object and the destination object, the request also including a snapshot time that is a time reference that represents a state of the source object that was used to generate the write data;
   verifying the transaction by comparing the snapshot time with a last-modified time of the source object to determine whether or not the snapshot time represents a most current state of the source object; and
   cause the write operation to be committed to the shared log in response to the transaction being verified.

9. The non-transitory computer-readable storage medium of claim 8, wherein the source object has a corresponding last-modified time that represents a time of last modification of the source object, wherein execution of the computer executable instructions further cause the first process to compare the snapshot time with the last-modified time of the source object to determine whether the snapshot time represents the most current state of the source data that was used to generate the write data.

10. The non-transitory computer-readable storage medium of claim 9, wherein the snapshot time represents the most current state of the source data when the snapshot time is greater than or equal to the last-modified time of the source object.

11. The non-transitory computer-readable storage medium of claim 8, wherein the destination object has a corresponding last-modified time that represents a time of last modification of the destination object, wherein execution of the computer executable instructions further cause the first process to increment the last-modified-time for the destination objects in response to a determination that the most current state of the source data was used to generate the write data.

12. The non-transitory computer-readable storage medium of claim 8, wherein execution of the computer executable instructions further cause the computer system to execute a second process separate from the first process to:
   receive the write data; and
   write the write data to the shared log.

13. The non-transitory computer-readable storage medium of claim 12, further comprising the first process signaling a client machine in response to a determination that the snapshot time represents a most current state of the source data that was used to compute the write data, wherein the client machine sends the write data to the second process to be written to the shared log.

14. The non-transitory computer-readable storage medium of claim 12, wherein execution of the computer executable instructions further cause the second process to:
   store the received write data to a write buffer; and
   delete the received write data from the write buffer without committing the write data to the shared log in response to a determination that the snapshot time does not represent the most current state of the source data that was used to generate the write data.

15. A computer system comprising:
   one or more computer processors; and
   a computer-readable storage medium comprising instructions for controlling the one or more computer processors to execute a first process to:
      receive a request to verify a transaction, the transaction including a read operation of reading source data from a source object in a shared log and a write operation of writing a write data to a destination object in the shared log, the write data being generated based on at least the source data, the request identifying the source object and the destination object, the request also including a snapshot time that is a time reference that represents a state of the source object that was used to generate the write data;
      verifying the transaction by comparing the snapshot time with a last-modified time of the source object to determine whether or not the snapshot time represents a most current state of the source object; and
      cause the write operation to be committed to the shared log in response to the transaction being verified.

16. The computer system of claim 15, wherein the source object has a corresponding last-modified time that represents a time of last modification of the source object, the computer-readable storage medium further comprising instructions for controlling the one or more computer processors to execute the first process to compare the snapshot time with the last-modified time of the source object to determine whether the snapshot time represents the most current state of the source data that was used to generate the write data.

17. The computer system of claim 16, wherein the snapshot time represents the most current state of the source data when the snapshot time is greater than or equal to the last-modified time of the source object.

18. The computer system of claim 15, wherein the destination object has a corresponding last-modified time that represents a time of last modification of the destination object, the computer-readable storage medium further comprising instructions for controlling the one or more computer processors to execute the first process to increment the last-modified-time for the destination object in response to a determination that the most current state of the source data was used to generate the write data.

19. The computer system of claim 15, the computer-readable storage medium further comprising instructions for controlling the one or more computer processors to execute a second process different from the first process to:
   receive the write data; and
   write the write data to the shared log.

20. The computer system of claim 19, the computer-readable storage medium further comprising instructions for controlling the one or more computer processors to execute the first process to send a FAIL signal to a client machine in response to a determination that the snapshot time does not represent the most current state of the source data that was used to generate the write data.

* * * * *